US008526314B2

(12) United States Patent
Qiu et al.

(10) Patent No.: US 8,526,314 B2
(45) Date of Patent: Sep. 3, 2013

(54) METHODS AND APPARATUS TO PROVIDE SERVICE ASSURANCE FOR COMMUNICATION NETWORKS

(75) Inventors: Chaoxin Charles Qiu, Austin, TX (US); Haifeng Bi, San Antonio, TX (US); Robert Francis Dailey, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1335 days.

(21) Appl. No.: 11/466,226

(22) Filed: Aug. 22, 2006

(65) Prior Publication Data

US 2008/0049623 A1 Feb. 28, 2008

(51) Int. Cl.
*H04L 12/26* (2006.01)
*H04L 12/28* (2006.01)
*H04L 12/66* (2006.01)

(52) U.S. Cl.
USPC .......................................... 370/252; 370/254

(58) Field of Classification Search
USPC ........................ 370/252–254, 352.1; 725/109
See application file for complete search history.

(56) References Cited

U.S. PATENT DOCUMENTS

| | | | |
|---|---|---|---|
| 7,016,475 B2 | 3/2006 | Resuta | |
| 7,024,161 B1 * | 4/2006 | LaMedica, Jr. | 455/67.11 |
| 7,031,264 B2 * | 4/2006 | Adhikari et al. | 370/252 |
| 7,042,880 B1 | 5/2006 | Voit et al. | |
| 2002/0123335 A1 * | 9/2002 | Luna et al. | 455/419 |
| 2002/0145979 A1 | 10/2002 | Baj | |
| 2002/0167936 A1 | 11/2002 | Goodman | |
| 2002/0188755 A1 * | 12/2002 | Yeom | 709/238 |
| 2004/0062204 A1 | 4/2004 | Bearden et al. | |
| 2004/0071084 A1 * | 4/2004 | El-Hennawey et al. | 370/230 |
| 2004/0261116 A1 * | 12/2004 | Mckeown et al. | 725/109 |
| 2005/0261895 A1 | 11/2005 | Bauer et al. | |
| 2005/0265240 A1 | 12/2005 | Jain et al. | |
| 2006/0104218 A1 | 5/2006 | Kako | |
| 2006/0203801 A1 * | 9/2006 | Li et al. | 370/352 |
| 2007/0171834 A1 * | 7/2007 | Sathyanarayana et al. | 370/241 |

* cited by examiner

*Primary Examiner* — Kevin C Harper
*Assistant Examiner* — Samina Choudhry
(74) *Attorney, Agent, or Firm* — Hanley, Flight & Zimmerman, LLC.

(57) ABSTRACT

Methods and apparatus to provide service assurance for communication networks are disclosed. An example apparatus comprises a service provisioning server to initiate provisioning of a service to a user device, and a service testing server to perform a test of the service and to report a service test result to the service provisioning server, the service testing server responsive to a request from the user device to initiate the test of the service, the user device automatically generating the request in response to the service provisioning.

25 Claims, 8 Drawing Sheets

METHODS AND APPARATUS TO PROVIDE SERVICE ASSURANCE FOR COMMUNICATION NETWORKS

FIELD OF THE DISCLOSURE

This disclosure relates generally to communication networks and, more particularly, to methods and apparatus to provide service assurance for communication networks.

BACKGROUND

For mature communication networks and/or communication technologies (e.g., the traditional public switched telephone network (PSTN)), there is a relatively small probability that a newly activated service and/or service change does not work correctly the first time. However, for some newer communication services and/or communication technologies (e.g., voice over Internet Protocol (VoIP)), the likelihood of communication services working fully and/or properly when initially provisioned and/or configured may be relatively less than for a more mature communication server and/or technology.

DETAILED DESCRIPTION

Methods and apparatus to provide service assurance for communication networks are disclosed. A disclosed example method includes receiving a notification of a change of a communication service at a service provisioning server, and sending a service configuration parameter and a first test call parameter from the service provisioning server to a user device to enable the user device and a service testing server to automatically test the changed service based on the test call parameter. Another disclosed example method includes receiving at a user device a service configuration from a device management server, the service configuration including a test call parameter, and initiating a test communication session to a service testing server automatically based on the test call parameter.

A disclosed example apparatus includes a service provisioning server to initiate provisioning of a service to a user device, and a service testing server to perform a test of the service and to report a service test result to the service provisioning server, the service testing server responsive to a request from the user device to initiate the test of the service, the user device automatically generating the request in response to the service provisioning. Another disclosed example apparatus includes a voice over Internet protocol (VoIP) processor, and a test module to initiate a test call for a service, the test call automatically initiated responsive to at least one of a received configuration parameter, a received provisioning parameter or a received test parameter.

Figure 1:
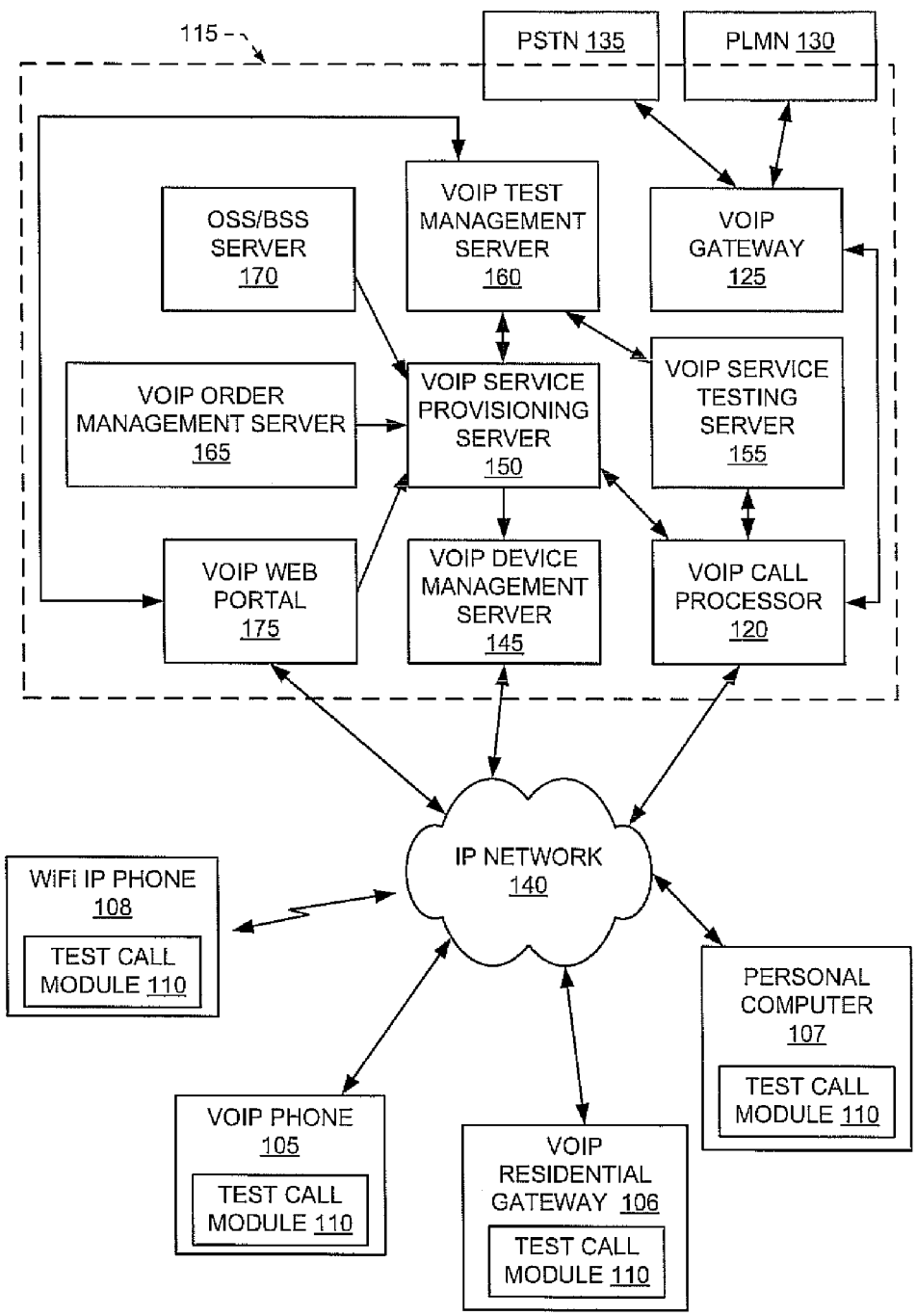
FIG. 1 is a schematic illustration of an example voice over Internet protocol (VoIP) communication system constructed in accordance with the teachings of the invention.

FIG. 1 is a schematic illustration of an example voice over Internet protocol (VoIP) communication system constructed in accordance with the teaching of the invention. In the interest of brevity and clarity, throughout the following disclosure references will be made to providing service assurance for the example VoIP communication system of FIG. 1, VoIP networks, VoIP devices and/or VoIP services. However, it should be understood that the methods and apparatus to provide service assurance disclosed herein are applicable to other types and/or varieties of communication services, networks, technologies and/or systems such as public switched telephone network (PSTN) systems, wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or combinations and/or hybrids of these devices, systems and/or networks.

Further, while in the following disclosure example VoIP devices initiate test calls and/or test communication sessions, persons of ordinary skill in the art will readily appreciate that an example VoIP communication network may, additionally or alternatively, initiate test calls and/or test communication sessions. Moreover, while the following disclosure utilizes session initiation protocol (SIP) exchanges, messages and/or techniques to initiate, establish, carry-out, end and/or terminate test calls and/or test communication sessions, any of a variety of communication protocol(s), message(s), exchange(s) and/or technique(s) for initiating, establishing, carrying-out, ending and/or terminating test calls and/or test communication sessions may be utilized. For example, in accordance with a current or future media gateway control protocol (MGCP) standard and/or specification such as International Telecommunication Union (ITU) H.248.

To allow users to, for example, place and/or receive a VoIP based telephone call, the example communication system of FIG. 1 includes one or more VoIP devices, four of which are illustrated in FIG. 1 with reference numerals 105, 106, 107 and 108. The example VoIP devices 105, 106, 107 and 108 may be any type of VoIP device including, for example, a corded and/or cordless VoIP phone 105, a VoIP residential gateway 106, a VoIP enabled personal computer 107, a VoIP endpoint, a wireless VoIP device 108 (e.g., a wireless-fidelity (Wi-Fi) Internet protocol (IP) phone), or a VoIP adapter (e.g., analog telephone adapter (ATA)).

As illustrated in FIG. 1, each of the example VoIP devices 105, 106, 107 and 108 of FIG. 1 includes a test call module 110. The example test call module 110 of FIG. 1 can initiate one or more VoIP test calls and/or test VoIP communication sessions in response to, and/or as directed by, one or more test call parameters received together with, and/or as a part of, provisioning and/or service configuration data, parameters and/or information. In the example of FIG. 1, the test call parameters and/or the provisioning and/or service configuration data, parameters and/or information may be received at, downloaded by and/or loaded into the example VoIP devices 105, 106, 107 and 108. Example manners of implementing any of the example VoIP devices 105, 106, 107 and 108 are discussed below in connection with FIGS. 2, 5, 6 and 7.

While the example VoIP devices 105, 106, 107 and 108 of FIG. 1 include test call modules 110 that implement substantially similar functionality, a particular test call module 110 implemented by any of the VoIP devices 105, 106, 107 and/or 108 may differ in any of a variety of ways from a test call module 110 implemented by any other of the VoIP devices 105, 106, 107 and/or 108. For example, a first example test call module 110 (e.g., implemented by the example PC 107) may be implemented as machine accessible instructions executed by a processor, while a second example test call module 110 (e.g., implemented by the example VoIP phone 105) is implemented as any combination of firmware, hardware and/or logic. Moreover, the example test call modules 110 may differ in the number and/or variety of features they include and/or perform.

To provide VoIP communication services, the example system of FIG. 1 includes a VoIP communication network 115. To initiate, receive, establish, complete and/or route any of a variety of VoIP communication sessions and/or VoIP telephone calls with, to and/or between the example VoIP devices 105, 106, 107 and/or 108, the example VoIP communication network 115 of FIG. 1 may communicate with and/or contain any portion of any of a variety of VoIP call processor(s) 120, VoIP gateway(s) 125. An example VoIP communication network 115 is implemented in accordance with a current and/or future $3^{rd}$ Generation Partnership Program (3GPP) Internet Multimedia Subsystem (IMS) standard. As illustrated in FIG. 1, the example VoIP communication network 115 may include an interface to and/or contain a portion of a public land mobile network (PLMN) 130 (i.e., a cellular communication network), an interface to and/or contain a portion of a PSTN 135, and/or an interface to and/or contain a portion of any of a variety of additional communication networks. For example, using any of a variety of technique(s), method(s), protocol(s) and/or technology(-ies), the VoIP call processor 120, the VoIP gateway 125 and the PSTN 135 can facilitate telephone calls between a PSTN-based phone (not shown) and any of the example VoIP devices 105, 106, 107 and 108.

In the illustrated example of FIG. 1, the VoIP gateway 125 may be, for example, and/or may implement a media gateway control function (MGCF). The example VoIP gateway 125 may be associated with the VoIP communication network 115, the PLMN 130, the PSTN 135 and/or any other communication network.

The example PLMN 130 and/or the example PSTN 135 of FIG. 1 may be implemented by any of a variety of communication devices, switches, protocols, systems and/or technologies. For instance, the example PLMN 130 may include one or more cellular base stations that can transmit cellular signals to and/or receive cellular signals from a cellular communication device using any of a variety of protocols (e.g., time-divisional multiple access (TDMA) or code-divisional multiple access (CDMA)).

In the illustrated example of FIG. 1, the example VoIP devices 105, 106, 107 and 108 are communicatively coupled to the example VoIP communication network 115 via any variety of IP networks 140 such as the Internet. However, any of a variety of current and/or future communication network(s), communication system(s), communication device(s), transmission medium(s), protocol(s), technique(s) and/or standard(s) could be used to communicatively couple the VoIP devices 105, 106, 107 and 108 and the VoIP communication network 115. Interfaces between the VoIP devices 105, 106, 107 and 108 and the IP network 140 and/or the VoIP communication network 115 and the IP network 140 may be implemented using any of a variety of current and/or future device(s), technology(-ies) and/or method(s). For example, the example VoIP devices 105, 106, 107 and/or 108 may be coupled to the IP network 140 via any of a variety of voice-band modem(s), digital subscriber line (DSL) modem(s), cable modem(s), Ethernet transceiver(s), optical transceiver(s), IP virtual private network (VPN) connection(s), IEEE 802.11x (a.k.a. WiFi) transceiver(s), IEEE 802.16 (a.k.a. WiMax), access point(s), etc. Moreover, the example IP network 140 of FIG. 1 may extend geographically to include a location near to and/or encompassing a VoIP device 105, 106, 107 and/or 108. For example, the IP network 140 may include a wireless access point (not shown) by which, for example, the example WiFi IP phone 108 connects to the IP network 140.

To provision and/or configure VoIP services to the VoIP devices 105, 106, 107 and 108, the example VoIP communication network 115 of FIG. 1 includes a VoIP device management server 145 and a VoIP service provisioning server 150. When, and/or as instructed, by the example service provisioning server 150 and using any of a variety of technique(s), method(s) and/or protocol(s), the example device management server 145 informs one or more of the example VoIP devices 105, 106, 107 and 108 when service provisioning and/or service configuration information and/or parameters are available for downloading and/or installation. Additionally or alternatively, the example device management server 145 may send the service provisioning and/or service configuration information and/or parameters directly to one or more of the VoIP devices 105, 106, 107 and 108.

In the illustrated example of FIG. 1, the service provisioning and/or service configuration information and/or parameters sent and/or provided by the device management server 145 includes one or more test parameters that specify and/or characterize whether or not one or more test calls and/or test sessions are to be initiated by a provisioned and/or configured VoIP device 105, 106, 107 and 108. If a test call and/or test session is to be initiated, the one or more test call parameters may also specify and/or characterize one or more aspects, parameters and/or elements of the test call and/or session such as destination (e.g., telephone number or session initiation protocol (SIP) destination (e.g., a SIP URI), number of times to re-attempt the test call if previous attempt(s) fail and/or are unsuccessful, time between attempts and/or an indication of whether or not the test call(s) can be skipped. An example data structure that may be used by the example device management server 145 of FIG. 1 to provide test call parameter(s), service provisioning parameter(s), service configuration parameter(s), data and/or information to the example VoIP devices 105, 106, 107 and 108 is discussed below in connection with FIG. 4.

When a particular one of the example VoIP devices 105, 106, 107 and 108 of FIG. 1 receives test call parameters together with service provisioning and/or configuration information and/or data, the example test call module 110 associated with the particular one of the VoIP call devices 105, 106, 107 and 108 performs any specified test call(s) without the interaction of a person. That is, the example test call module 110 of FIG. 1 automatically responds to received test call parameters by automatically performing one or more tests of the newly provisioned and/or (re-)configured service to ensure that the communication service is properly functioning.

Service provisioning and/or service (re-)configuration may occur for any of a variety of reasons such as establishment of a new service, modification of a service plan, data rate changes, changes of access restrictions, software update, quality-of-service (QoS) changes, changes made to the example communication network 115, etc. Moreover service provisioning and/or service configuration information may provide and/or include any of a variety of configuration and/or provisioning data and/or information such as an IP address of a VoIP call processor 120 assigned to one or more of the VoIP devices 105, 106, 107 and 108 (i.e., a serving call processor 120), an allowed maximum transmit bandwidth, or a QoS parameter.

Additionally or alternatively, the example VoIP devices 105, 106, 107 and 108 of FIG. 1 may be configured to perform one or more test calls independent of service provisioning and/or service configuration. For example, the example VoIP communication network 115 of FIG. 1 may periodically or aperiodically configure the VoIP devices 105, 106, 107 and/or 108 to perform test calls that enable the VoIP communication network to monitor the performance and/or quality of the services currently provided by the VoIP communication network 115.

In addition to handling and/or coordinating service provisioning and/or service configurations for the example VoIP communication network 115, the example service provisioning server 150 of FIG. 1 coordinates, manages and/or performs service assurance for the example VoIP communication system of FIG. 1 by configuring, coordinating and/or handling automated testing of VoIP services and/or automated testing results. For a particular VoIP device 105, 106, 107 and/or 108 that is provisioned and/or configured with test parameters that specify one or more test calls to be performed, the example service provisioning server 150 of FIG. 1 utilizes results of the configured test call(s) to determine whether or not the provisioned and/or configured VoIP communication service is properly functioning. If a provisioned and/or configured VoIP service is determined and/or assumed to be working properly (e.g., the specified test call(s) were successful or were not required) the VoIP service can be placed into an active service state and usage of the VoIP service by a person can begin and/or continue. Thus, it is possible to hold a VoIP device 105, 106, 107 and/or 108 in an inactive state until the service provisioning server 150 determines through testing that the service is functioning properly.

If a provisioned and/or configured VoIP service is determined to not be working properly (e.g., the specified test call(s) were not successful, failed and/or had an unacceptable performance result), a trouble ticket can be automatically generated by a VoIP test management server 160 and/or the example service provisioning server 150 to allow, for example, a technician to resolve why the VoIP service is not fully and/or properly functional. Additionally or alternatively, the example service provisioning server 150 can adjust, select and/or determine a configuration parameter (e.g., a QoS setting), re-configure the VoIP device and/or re-test the VoIP service until an acceptable test result is obtained. By having the example VoIP communication network 115 and the example VoIP devices 105, 106, 107 and 108 automatically perform one or more test calls and/or test sessions to verify that a VoIP service is correctly functioning after provisioning and/or configuring is performed, the example VoIP communication system of FIG. 1 facilitates high levels of service quality, service reliability, service assurance and/or customer satisfaction. For example, a subscriber can be notified that the service has been activated after such testing has successfully occurred, thereby avoiding subscriber disappointment associated with the failure of a first call.

In the illustrated example of FIG. 1, the test management server 160 supports the service provisioning server 150 by handling the testing of (re-)configured and/or (re-)provisioned VoIP services and/or devices 105, 106, 107. Additionally or alternatively, the example test management server 160 can control any of the test call activities. In one example, the service provisioning server 150 could assist the test management server 160 by provisioning the VoIP call processor 120 with any necessary configuration parameter changes when a new test call and/or test call capability is set up and/or configured. In another example, the service provisioning server 150 can be a client of the test management server 160 such that, for example, when a new user VoIP device has successfully completed a test calls, the test management server 160 instructs the service provisioning server 150 to complete the new user activation procedure, such as initiating a local number portability (LNP) port. For ease of discussion, the following disclosure assumes that the test management server 160 operates to support the operations of the example service provisioning server 150.

To perform, handle and/or coordinate test calls, the example VoIP communication network 115 of FIG. 1 includes any number of VoIP service testing servers 155 and one or more VoIP test management servers 160. The example service testing server 155 of FIG. 1 responds to test calls and/or test sessions initiated by any of the VoIP devices 105, 106, 107 and 108. To facilitate the initiation of VoIP test calls and/or test communication sessions by the VoIP devices 105, 106, 107 and 108, the example service testing server 155 is assigned a public user identifier (PUID) such as a SIP uniform resource identifier (URI) (e.g., SIP: new_service_testor@voip.att.com) or a telephone number URI (e.g., a 1-800 number). The example service testing server 155 of FIG. 1 implements real-time packet (RTP) count and/or real-time control protocol (RTCP) packet performance counter values to measure and/or determine the performance of established test calls and/or test communication sessions. Once a test call and/or session is completed, the example service testing server 155 tears down and/or ends the test call and/or test session. In the illustrated example of FIG. 1, the example service testing server 155 provides the results of test calls and/or test communication sessions to the example test management server 160. When configured, and/or instructed, by the test management server 160, the example service testing server 155 of FIG. 1 may also initiate test calls and/or test sessions.

The example test management server 160 of FIG. 1 collects test call and/or test session results from one or more service testing servers 155 and makes the collected test results available to the service provisioning server 150 and/or to any of a variety of management system clients such as a customer care representative, a technician, an order management server 165, or operations support system (OSS) and/or business support system (BSS) server 170. Collected test results may be automatically sent to the management system clients and/or the service provisioning server 150 by the example test management server 160 and/or may be made available to and/or accessible by the management system clients and/or the service provisioning server 150 via any of a variety of interface(s), data structure(s) and/or protocol(s).

The management system clients may also initiate provisioning, service configuration changes and/or testing of VoIP services. For example, a customer care representative can enter an order for a new VoIP service via the example order management server 165, a technician can request testing of an existing VoIP service via the OSS/BSS server 170, a maintenance server (not shown) can request testing for a plurality of VoIP services, etc.

In an example VoIP communication network 115, the example OSS/BSS 170 tracks the initiation and/or completion of test calls and/or test communication sessions for the purpose of charging for test calls and/or test communication sessions. For example, tests calls and/or sessions configured by an operator of the VoIP communication network 115 may be free while test calls and/or sessions configured by a user of a VoIP device 105, 106, 107 and/or 108 may be charged a nominal fee. In another example, all test calls and/or sessions may be performed without charge.

In another example, test calls and/or sessions are recorded for purposes of tracking operational costs associated with the VoIP communication network 115.

To provide a person and/or customer with access to provisioning, configuration and/or testing information related to their VoIP service, the example VoIP communication network 115 may include any of a variety of web portals 175. The example web portal 175 of FIG. 1 may be used to initiate one or more tests of a customer's VoIP service and/or may be used to view the results of the tests initiated by the customer, by the VoIP communication network 115 and/or by an operator of the example network 115.

In response to a request for service provisioning, service configuration and/or service testing of a new and/or existing VoIP service by a requesting client (e.g., the VoIP order management server 165), the example service provisioning server 150 of FIG. 1 provisions, configures and/or sets service testing of the VoIP service via the example device management server 145. Once the VoIP service is provisioned, configured and/or tested, the example service provisioning server 150 provides the result(s) of any performed testing to the requesting server. Additionally and/or alternatively, the service provisioning server 150 need not report the testing result(s) and/or the service provisioning server 150, and/or the test management server 160 can retain the testing result(s) for subsequent access by the requesting server and/or the service provisioning server 150.

While an example VoIP communication network 115 has been illustrated in FIG. 1, the devices, servers, systems, gateways, portals, and/or processors illustrated in FIG. 1 may be combined, re-arranged, eliminated and/or implemented in any of a variety of ways. Further, the example VoIP devices 105, 106, 107 and 108, the example call test modules 110, the example call processor 120, the example gateway 125, the example device management server 145, the example service provisioning server 150, the example service testing server 155, the example test management server 160 and/or, more generally, the example VoIP communication network 115 of FIG. 1 may be implemented by hardware, software, firmware and/or any combination of hardware, software and/or firmware. Moreover, the example VoIP communication network 115 may include additional servers, systems, gateways, portals, and/or processors than those illustrated in FIG. 1 and/or may include more than one of any or all of the illustrated devices, servers, systems, gateways, portals, and/or processors.

Figure 2:
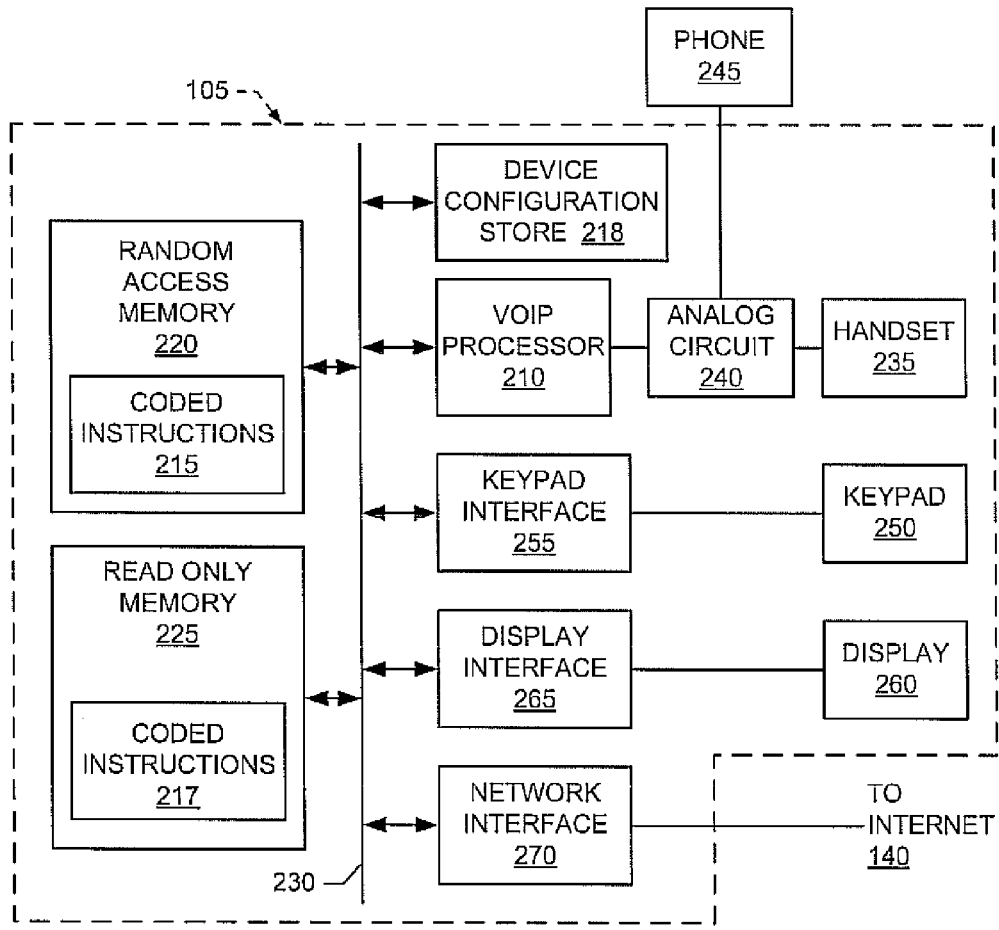
FIG. 2 illustrates an example manner of implementing any of the example VoIP devices of FIG. 1.

FIG. 2 illustrates an example manner of implementing any of the example VoIP devices 105, 106, 107 and 108 of FIG. 1. However, for ease of discussion, the example device of FIG. 2 will be referred to as a VoIP device 105. To handle any of a variety of VoIP processing functions, the example VoIP device 105 of FIG. 2 includes any of a variety of VoIP processors 210. The example VoIP processor 210 of FIG. 2 implements, among other things, session control, VoIP protocols, a SIP user agent, and a coder (not shown) to encode speech signals, a decoder (not shown) to decode received speech signals, a packetizer (not shown) to packetize encoded speech data and a de-packetizer (not shown) to de-packetize encoded speech data.

In addition to any of a variety of specialized hardware, firmware and/or logic to perform VoIP processing functions, the example VoIP processor 210 of FIG. 2 may include any of a variety of specialized and/or general purpose controller(s) and/or processing unit(s) capable of executing coded instructions. For example, the controller and/or processing unit may perform any of a variety of VoIP processing functions by carrying out and/or executing coded instructions 215 and/or 217 present in a main memory of the VoIP processor 210 (e.g., within a random-access memory (RAM) 220 and/or a read-only memory (ROM) 225). As illustrated in FIG. 2, the coded instructions 215 and/or 217 may include coded instructions that may be executed to implement the example test call module 110 of FIG. 1. For example, coded instructions 215 and/or 217 may be carried out to implement the examples discussed below in connection with FIGS. 5, 6 and/or 7. Additionally or alternatively, any or all of the example test call module 110 of FIG. 1 may be implemented as hardware, software firmware and/or logic and/or any combination of hardware, software, firmware and/or logic within the VoIP processor 210 and/or, more generally, within the example VoIP device 105 of FIG. 2.

The example VoIP processor 210 is in communication with the main memory (including a read-only memory (ROM) 225 and the RAM 220) and other devices and/or modules of the example VoIP device 105 of FIG. 2 via any type and/or number of buses 230. The example RAM 220 may be implemented by, for example, dynamic random-access memory (DRAM), synchronous dynamic random-access memory (SDRAM), and/or any other type of RAM device(s), and the example ROM 225 may be implemented by, for example, flash memory(-ies) and/or any other desired type of memory device(s). Access to the example memory 220 and 225 is typically controlled by a memory controller (not shown).

To store one or more service and/or device configuration parameters and/or variables, the example VoIP device 105 of FIG. 2 includes a device configuration store 218. The example device configuration store 218 of FIG. 2 stores received testing, service configuration and/or provisioning data and/or information using any of a variety of data structure(s), array(s), table(s), database(s) or variable(s). The device configuration store 218 may be stored in any of a variety of memory devices such as a flash memory.

To electrically couple signals (e.g., speech signals) between handset 235 and the example VoIP processor 210, the example VoIP device 105 of FIG. 2 includes any of a variety of analog circuits 240. An example analog circuit 240 includes any of a variety of filter(s), analog-to-digital converter(s) and/or digital-to-analog converter(s) to convert between analog signals sent to and/or received from the example handset 235 and digital signals sent to and/or received from the example VoIP processor 210. The handset 235 can be corded or cordless.

To this end, the example analog circuit 240 of FIG. 2 may implement any of a variety of wireless communication technologies to communicatively couple the example VoIP processor 210 with any variety of cordless handset 235. Moreover, the example analog circuit 240 of FIG. 2 may, additionally or alternatively, implement any variety of SLIC to allow any variety of corded and/or cordless PSTN-based telephone 245 to be electrically coupled to the example VoIP processor 210 of FIG. 2. The latter example could be used, for instance, in implementations where the example VoIP device 105 is located in and/or implements a VoIP adapter and/or gateway.

To facilitate user inputs via any of a variety of keypads 250, the example VoIP device 105 of FIG. 2 includes any of a variety of keypad interfaces 255. The example keypad interface 255 of FIG. 2 electrically couples and/or translates electrical signals conveying key press information from the example keypad 250 to the example VoIP processor 210.

To provide output information to a user via any of a variety of displays 260, the example VoIP device 105 of FIG. 2 includes any of a variety of display interfaces 265. An example display interface 265 receives information (e.g., alphanumeric characters) to be displayed from the example VoIP processor 210 and creates electrical signals suitable for displaying the information on the example display 260. An example display 260 is a liquid-crystal display (LCD) screen.

To communicatively couple the example VoIP device 105 to the IP network 140, a local-area network (LAN), a modem, a router, a bridge and/or a gateway, the example VoIP device 105 includes a network interface 270. The example network interface 270 of FIG. 2 implements any of a variety of communication and/or data interface(s) in accordance with any of a variety of current and/or future standards such as Ethernet, DSL, WiMax, WiFi, cable modems, etc.

While an example VoIP device 105 is illustrated in FIG. 2, the VoIP device 105 may be implemented using any of a variety of other and/or additional processors, devices, components, circuits, modules, interfaces, etc. Further, the processors, devices, components, circuits, modules, elements, interfaces, etc. illustrated in FIG. 2 may be combined, re-arranged, eliminated and/or implemented in any of a variety of ways. Additionally, the example test call module 110, the example VoIP processor 210, the network interface 270 and/or the example VoIP device 105 may be implemented as any combination of firmware, software, logic and/or hardware. Moreover, the example VoIP device 105 may include additional processors, devices, components, circuits, interfaces and/or modules than those illustrated in FIG. 2 and/or may include more than one of any or all of the illustrated processors, devices, components, circuits, interfaces and/or modules.

Figure 2A:
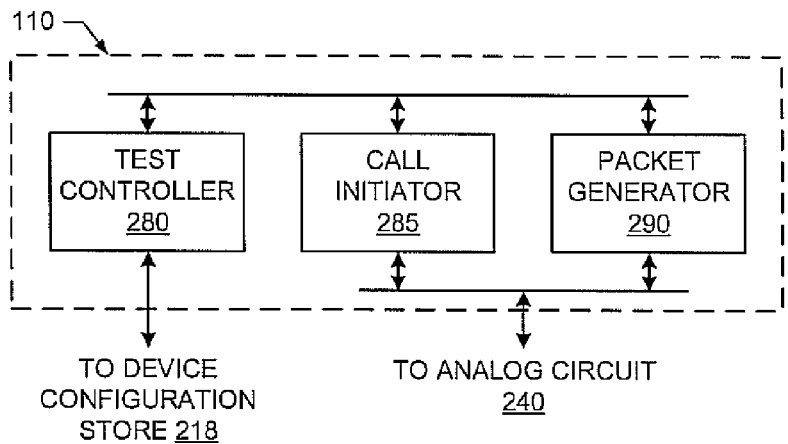
FIG. 2A illustrates an example manner of implementing any of the example test modules of FIG. 1.

FIG. 2A illustrates an example manner of implementing any of the example test modules 110 of FIG. 1. To extract and/or select one or more parameters from service, testing and/or provisioning parameters (e.g., from the example data structure of FIG. 4), the example test module 110 of FIG. 1 includes a test controller 280. Using any of a variety of technique(s) and/or method(s), the example test controller 280 of FIG. 2A extracts one or more parameters and/or values from received testing, service configuration and/or provisioning data and/or information stored in a device configuration store (e.g., the example store 218 of FIG. 2). Based upon the one or more extracted parameter and/or values, the example test controller 280 of FIG. 2A instructs and/or directs a call initiator 285 to initiate one or more test calls and/or a packet generator 290 to generate and/or send RTP packets.

To initiate test calls and/or test sessions, the example test call module 110 of FIG. 2A includes the test call initiator 285. Based upon one or more parameters and/or values extracted by the test controller 280, the example test call initiator 285 of FIG. 2A initiates, establishes, completes, participates and/or ends one or more test calls. An example test call initiator 285 is implemented by, as a part of, and/or within a SIP user agent associated with the VoIP call processor 210 (FIG. 2). Alternatively, the test call initiator 285 may be communicatively coupled to a SIP user agent and/or, more generally, the VoIP call processor 210.

To generate test data for a test call and/or test session, the example test call module 110 of FIG. 2A includes the packet generator 290. The example packet generator 290 of FIG. 2A creates and/or sends test and/or dummy RTP packets to a service testing server (e.g., the example service testing server 155 of FIG. 1) once a test call and/or test session is established.

While an example test module 110 is illustrated in FIG. 2A, the test call module 110 may be implemented using any of a variety of other and/or additional processors, devices, components, circuits, modules, interfaces, etc. Further, the processors, devices, components, circuits, modules, elements, interfaces, etc. illustrated in FIG. 2A may be combined, re-arranged, eliminated and/or implemented in any of a variety of ways. Additionally, the example test call module 110 may be implemented as any combination of firmware, software, logic and/or hardware. For example, the example test call module may be implemented as coded instructions (e.g., the example coded instructions 215 and/or 217) executed by, for example, the example VoIP processor 210 of FIG. 2. Moreover, the example test call module 110 may include additional processors, devices, components, circuits, interfaces and/or modules than those illustrated in FIG. 2A and/or may include more than one of any or all of the illustrated processors, devices, components, circuits, interfaces and/or modules.

Figure 3:
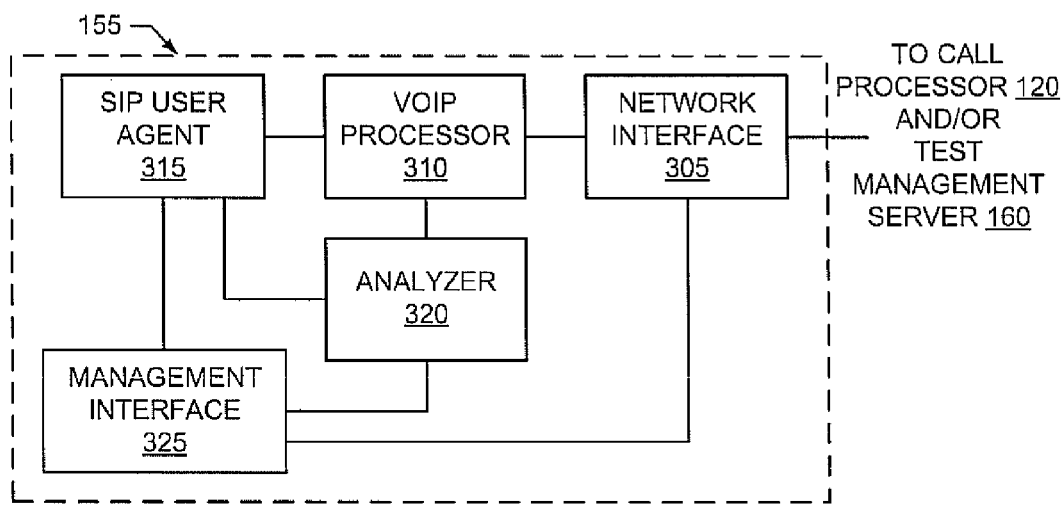
FIG. 3 illustrates an example manner of implementing the example service testing server of FIG. 1.

FIG. 3 illustrates an example manner of implementing the example VoIP service testing server 155 of FIG. 1. To communicatively couple the example service testing server 155 with other systems and/or servers of the example VoIP communication network 115 and/or the example VoIP devices 105, 106, 107 and 108 of FIG. 1, the example service testing server 155 of FIG. 3 includes any of a variety of network interfaces 305. The example network interface 305 of FIG. 3 implements any of a variety of Ethernet interfaces in accordance with any of a variety of current and/or future standards.

To handle any of a variety of VoIP processing functions, the example service testing server 155 of FIG. 3 includes any of a variety of VoIP processors 310. The example VoIP processor 310 of FIG. 3 implements, among other things, a SIP protocol stack. While the example VoIP device 105 of FIG. 2 and the example service testing server 155 of FIG. 3 both include a VoIP processor, persons of ordinary skill in the art will readily appreciate that the example VoIP processor 210 and the example VoIP processor 310 need not implement the same VoIP functions and/or implement any particular VoIP function in the same fashion. The VoIP processors of the illustrated examples are typically implemented in accordance with any of a variety of current and/or future standards and, thus, the example VoIP processor 210 and the example VoIP processor 310 can facilitate and/or enable VoIP communication services between the example VoIP device 105 of FIG. 2 and the example service testing server 155 of FIG. 3.

To receive and/or establish test calls and/or test sessions in response to test calls and/or test sessions initiated by the example VoIP devices 105, 106, 107 and 108, the example service testing server 155 of FIG. 3 includes any of a variety of SIP user agents 315. The example SIP user agent 315 of FIG. 3 implements, among other things, session control and/or VoIP protocols in accordance with any of a variety of current and/or future standards. To facilitate the initiation of test calls by the VoIP devices 105, 106, 107 and 108 to the example service testing server 155, the example SIP user agent 315 is assigned a PUID such as a SIP URI (e.g., SIP: new_service_testor@voip.att.com) or a telephone number URI (e.g., a 1-800 number). Once testing for a test call and/or session is completed, the example SIP user agent 315 initiates the tear down and/or end of the test call and/or test session. When and/or as instructed and/or configured by the example test management server 160 of FIG. 1, the example SIP user agent 315 of FIG. 3 may also initiate test calls and/or test sessions to the VoIP devices 105, 106, 107 and/or 108.

To implement performance testing and/or characterization of test calls and/or test communication sessions, the example service testing server 155 of FIG. 1 includes any of a variety of RTP and/or RTCP packet analyzer 320. Using any of a variety of method(s), technique(s) and/or algorithm(s), the example analyzer 320 of FIG. 3 receives and/or collects RTP count and/or RTCP packet performance counter values to measure and/or determine the performance of test calls and/or test communication sessions.

To provide the result(s) of test calls and/or test communication sessions to the example test management server 160 of FIG. 1, the example service testing server 155 of FIG. 3 includes any of a variety of management interfaces 325. An example management interface 325 collects and/or receives test results from the example analyzer 320 and sends them to the test management server 160 via the example network interface 305 using any of a variety of data structure(s), protocol(s) and/or technique(s). Additionally or alternatively, the example management interface 325 implements any of a variety of data structure(s) and/or database(s) to store test results such that the test management server 160 can poll and/or otherwise obtain the test results from the example service testing server 155 via any of a variety of interfaces provided by the management interface 325.

While an example service testing server 155 is illustrated in FIG. 3, the example service testing server 155 may be implemented using any of a variety of other and/or additional processors, devices, components, circuits, modules, interfaces, etc. Further, the processors, devices, components, circuits, modules, elements, etc. illustrated in FIG. 3 may be combined, re-arranged, eliminated and/or implemented in any of a variety of ways. Additionally, the example network interface 305, the example VoIP processor 310, the example SIP user agent 315, the example analyzer 320 and/or the example management interface 325 may be implemented as any combination of firmware, software and/or hardware. Moreover, the example service testing server 155 may include additional processors, devices, components, circuits, interfaces and/or modules than those illustrated in FIG. 3 and/or may include more than one of any or all of the illustrated processors, devices, components, circuits, interfaces and/or modules.

Figure 4:
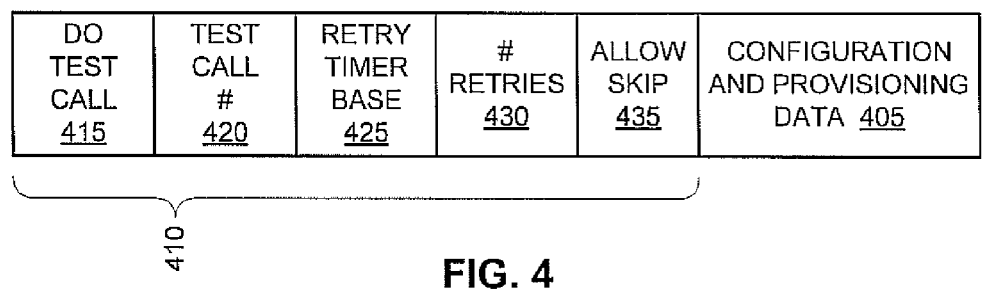
FIG. 4 illustrates an example configuration data structure that includes call testing parameters.

FIG. 4 illustrates an example service provisioning and/or service configuration data structure. To provide any number and/or variety of service provisioning and/or service configuration data and/or information, the example data structure of FIG. 4 includes configuration and provisioning data 405. The example configuration and/or provisioning data 405 may be structured to contain any of a variety of fields, variables, values, data and/or records necessary to provision and/or configure a communication service. Example configuration and/or provisioning data 405 includes an IP address for a serving VoIP call processor 120 (FIG. 1), a QoS parameter and/or a maximum allowable transmit bandwidth.

To provide parameters associated with test calls and/or test communication sessions to be performed after service provisioning and/or configuration, the example data structure of FIG. 4 includes one or more test call parameters for test call execution control 410. To indicate and/or specify if a test call is to be performed after provisioning and/or configuring has been performed, the example test call fields 410 includes a do_test_call field 415. The example do_test_call field 415 of FIG. 4 is a flag that indicates whether a test call is to be made (e.g., a TRUE flag) or is not to be made (e.g., a FALSE flag).

To specify the destination to which a test call and/or session is to be initiated, the example test call fields 410 include a test_call_number field 420. The example test_call_number field 420 of FIG. 4 specifies a SIP URI (e.g., SIP: new_service_testor@voip.att.com) or a telephone number URI (e.g., a 1-800 number) to which test calls and/or test sessions are to be initiated.

To specify the time period over which a test call and/or session may be initiated, the example test call fields 410 of FIG. 4 includes a retry_timer_base field 425. The example retry_timer_base field 425 of FIG. 4 contains a value used by a receiving test call module 110 (FIG. 1) to set a countdown timer. When a test call and/or session fails, the test call module 110 starts the countdown timer. When the countdown timer expires, the test call module 110 re-attempts to initiate the test call and/or test session.

To specify the maximum number of times that a receiving test call module 110 may attempt to initiate the specified test call and/or test session, the example test call fields 410 of FIG. 4 include a number_of_retries field 430. When a test call module 110 reaches the maximum number of retries specified by the number_of_retries field 430 without successfully executing a test call or test session, the example test call module 110 stops attempting to initiate the configured test call and/or test session.

To indicate if the test call and/or test session may be skipped, the example test call fields 410 of FIG. 4 includes an allow_skip field 435. The example allow_skip field 435 of FIG. 4 is a flag that indicates whether the test call may be skipped (e.g., a TRUE flag) or may not be skipped (e.g., a FALSE flag). If the allow_skip field 435 indicates that the configured test call may be skipped (e.g., a TRUE flag), the test call module 110 may, depending upon its implementation and/or a configurable parameter, skip initiating the configured and/or requested test call and/or test session. In the illustrated example of FIG. 1, the allow_skip field 435 normally contains a FALSE flag since a test call is used to advance the operation state of the VoIP service. An example scenario for which the allow_skip field 425 might be set to TRUE is when a test call is configured with other service management activities such as determining which software version the VoIP devices 105, 106, 107 and/or 108 are executing.

While an example provisioning and/or configuration data structure is illustrated in FIG. 4, the example data structure may be implemented using any of a variety of other and/or additional fields and/or data. Further, the fields and/or data illustrated in FIG. 4 may be combined, re-arranged, eliminated and/or implemented in any of a variety of ways. Moreover, the example data structure may include additional fields and/or data than those illustrated in FIG. 4 and/or may include more than one of any or all of the illustrated fields and/or data. For example, more than one of the test call fields 410 may be present to configure an alternative and/or additional test call and/or test call session.

Figure 5:
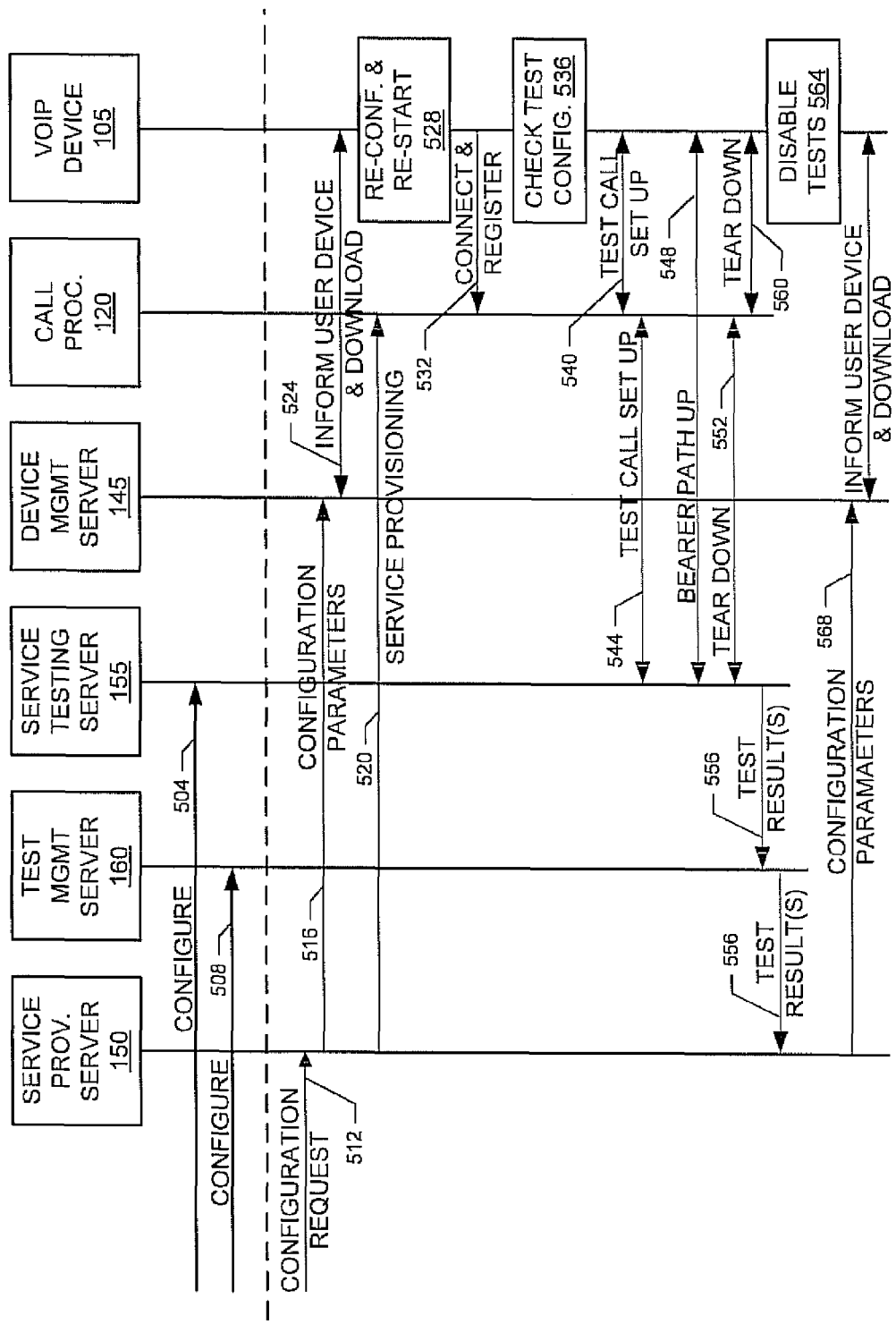
FIGS. 5 and 6 are diagrammatic illustrations of example behaviors of the example VoIP system of FIG. 1.

FIG. 5 diagrammatically illustrates an example behavior of the example VoIP communication system of FIG. 1. The example of FIG. 5 illustrates a configuration of the example VoIP device 105, the completion of a test call between the VoIP device 105 and the example service testing server 155, and the providing of test results to the example service provisioning server 150 of FIG. 1.

While for ease of understanding the example of FIG. 5 illustrates an example interaction with a single VoIP device 105, interactions with any number of VoIP devices 105, 106, 107 and/or 108 may occur during partially or wholly overlapping time intervals. For example, the example VoIP communication network 115 of FIG. 1 may perform a configuration update for a particular VoIP device 105, 106 or 107 while simultaneously performing a test call for another VoIP device 105, 106 or 107.

The illustrated example of FIG. 5 begins with the service testing server 155 receiving test call configuration parameters 504 such as the number of RTP packets to be received for each test call and/or test communication session. Likewise, the test management server 160 (FIG. 1) receives configuration information 508 that specify the actions to be taken by the test management server 160 when a test call and/or test communication session succeeds and/or fails. In the example of FIG. 5, the test management server 160 is configured to forward and/or send test results 556 to the service provisioning server 150. The configuration parameters 504 and/or the configuration information 508 are provided by an operator of the example VoIP communication network 115 using any of a variety of server(s) and/or interfaces.

The configuration parameters 504 and/or the configuration information 508 may be applied by the service testing server 155 and/or the test management server 160, respectively, to all test calls and/or test communication sessions. Additionally or alternatively, configuration parameters 504 and/or configuration information 508 customized for one or more particular VoIP devices 105, 106, 107 and 108 may be provided to the service testing server 155 and/or the test management server 160, respectively.

The configuration parameters 504 and/or the configuration information 508 may be provided at a time different from a time when provisioning and/or configuring of VoIP devices 105, 106, 107 and/or 108 occurs. For example, the configuration parameters 504 and/or the configuration information 508 may be provided during setup of the example VoIP communication network 115. Additionally or alternatively, the configuration parameters 504 and/or the configuration information 508 can be sent at a time when a particular VoIP device 105, 106, 107 and/or 108 is provisioned and/or configured such as when customized configuration parameters 504 and/or the configuration information 508 are utilized.

When the service provisioning server 150 receives a configuration and/or provisioning request 512 for a particular VoIP device 105, the service provisioning server 150 creates and/or sends corresponding configuration parameters, data and/or information 516 to the device management server 145. In the examples of FIGS. 1 and/or 5, the configuration parameters, data and/or information 516 include test call and/or test communication session parameters. Example test, provisioning and/or configuration parameters, data and/or information 516 are discussed above in connection with FIG. 4.

If, based on the request 512, configuration and/or provisioning of the VoIP call processor 120 is required, the service provisioning server 150 sends appropriate and/or corresponding configuration and/or provisioning data, information and/or parameters 520 to the call processor 120. For example, if provisioning of a new VoIP service is requested at reference numeral 512, the provisioning data, information and/or parameters 520 would provision the call processor 120 for the new VoIP service.

In response to receiving the configuration parameters, data and/or information 516, the device management server 145 notifies the VoIP device 105 of the configuration parameters, data and/or information causing the VoIP device 105 to download the configuration parameters, data and/or information 516 from the device management server 145 as shown in FIG. 5 with reference numeral 524. Additionally or alternatively, at reference number 524 the device management server 145 could send and/or transmit the configuration parameters, data and/or information 516 to the VoIP device 105 without waiting for a request to download the same.

Having downloaded and/or received the configuration parameters, data and/or information 516 via the device management server 145 (reference numeral 524), the VoIP device 105 configures itself and/or restarts (block 528). In the illustrated example of FIG. 5, once the VoIP device 105 has configured and/or re-started itself (block 528), the VoIP device 105 connects and registers with its serving call processor 120 as shown with reference numeral 532 in FIG. 5.

Having connected and registered with its serving call processor 120 (reference numeral 532), the VoIP device 105 checks the test call parameters (e.g., the example test call parameters 410 of FIG. 4) to determine if a test call and/or test communication session is to be initiated (block 536). If a test call is to be initiated (e.g., the example do_test_call field 415 of FIG. 4 set to TRUE) (block 536), the VoIP device 105 initiates a call setup 540 to the test call destination (e.g., a SIP URI and/or telephone URI corresponding to the service testing server 155) configured in the test call parameters.

In response to the call setup 540 initiated by the VoIP device 105, the call processor 120 initiates a call setup 544 to the service testing server 155 specified by the VoIP device 105 in the call setup 540. If the call setups 540 and 544 complete successfully (i.e., the test call to the test call destination is connected), an IP-based VoIP bearer path 548 becomes active between the VoIP device 105 and the service testing server 155. If either of the call setups 540 and 544 do not complete successfully, the VoIP device 105 may re-initiate the test call. In the illustrated example, whether or not the VoIP device 105 re-initiates the test call depends upon additional test call parameters such as maximum number of retries, a countdown timer duration and/or an implementation of the VoIP device 105.

Once a bearer path 548 is established for a test call, the VoIP device 105 and/or the service testing server 155 can send, receive and/or exchange data to test and/or characterize the test call. For example, the VoIP device 105 may create and send RTP packets that the service testing server 155 receives and/or checks. The VoIP device 105 and/or the service testing server 155 can also measure and/or determine the performance of the bearer path 548 associated with the test call by collecting performance counters and/or exchanging RTP stream performance information via a companion RTCP channel.

In the illustrated example of FIG. 1, the VoIP device 105 generates and sends RTP packets to the service testing server 155. The service testing server 155 counts the number of RTP packets it receives from each VoIP device 105 it is testing to determine whether or not the test call is successful. Each RTP stream can additionally or alternatively collect and/or measure performance information to augment the counters associated with companion RTCP packets that are communicated via a separate port. An example RTP port number is an even integer with its companion RTCP port number being the next odd integer.

In the example of FIG. 5, once the service testing server 155 determines that testing of the bearer path 548 is complete (e.g., a specified number of RTP packets have been received), the service testing server 155 initiates a tear down 552 for the test call, and sends the test result(s) 556 for the test call to the test management server 160. Based upon the configuration parameters 508 specifying how the test result(s) 556 are to be handled, the test management server 160 sends and/or forwards the test result(s) 556 to the service provisioning server 150.

The call processor 120 upon receipt of the tear down 552 initiates a corresponding tear down 560 to the VoIP device 105. In the example of FIG. 5, having received the tear down request 556, the VoIP device 105 disables additional test calls since the test call completed successfully (block 564).

When the test result(s) 556 are received at the service provisioning server 150, the service provisioning server 150 takes corresponding and appropriate action. For example, for the provisioning of a new VoIP service, the service provisioning server 150 may activate the VoIP service to the VoIP device 105 and initialize an associated billing record. For a maintenance request for testing of an existing service, the service provisioning server 150 may forward the test result(s) 556 to a requesting server. In another example, based upon the test result(s) 556, the service provisioning server 150 may also determine one or more Quality-of-service (QoS) parameters for use by the VoIP device 105. The QoS parameters may be sent as a part of configuration parameters 568 to the VoIP device 105 via the device management server 145 as shown in FIG. 5 as discussed above in connection with reference numerals 524, 528 and 532. The configuration parameters 568 may also contain test call parameters that specify another test call to be performed. If so, the process outlined above would be repeated to initiate and establish a test call and/or test communication session and/or to test an established bearer path. In yet another example, to help reduce the likelihood that the VoIP device 105 did not correctly detect the end of a successful test, the configuration parameters 568 could also be used to disable test calls at the VoIP device 105 by, for example, setting the example do_test_call field 415 (FIG. 4) to FALSE in the configuration parameters 568. In such a scenario, the configuration parameters 568 may not contain any provisioning and/or configuration changes.

Figure 6:
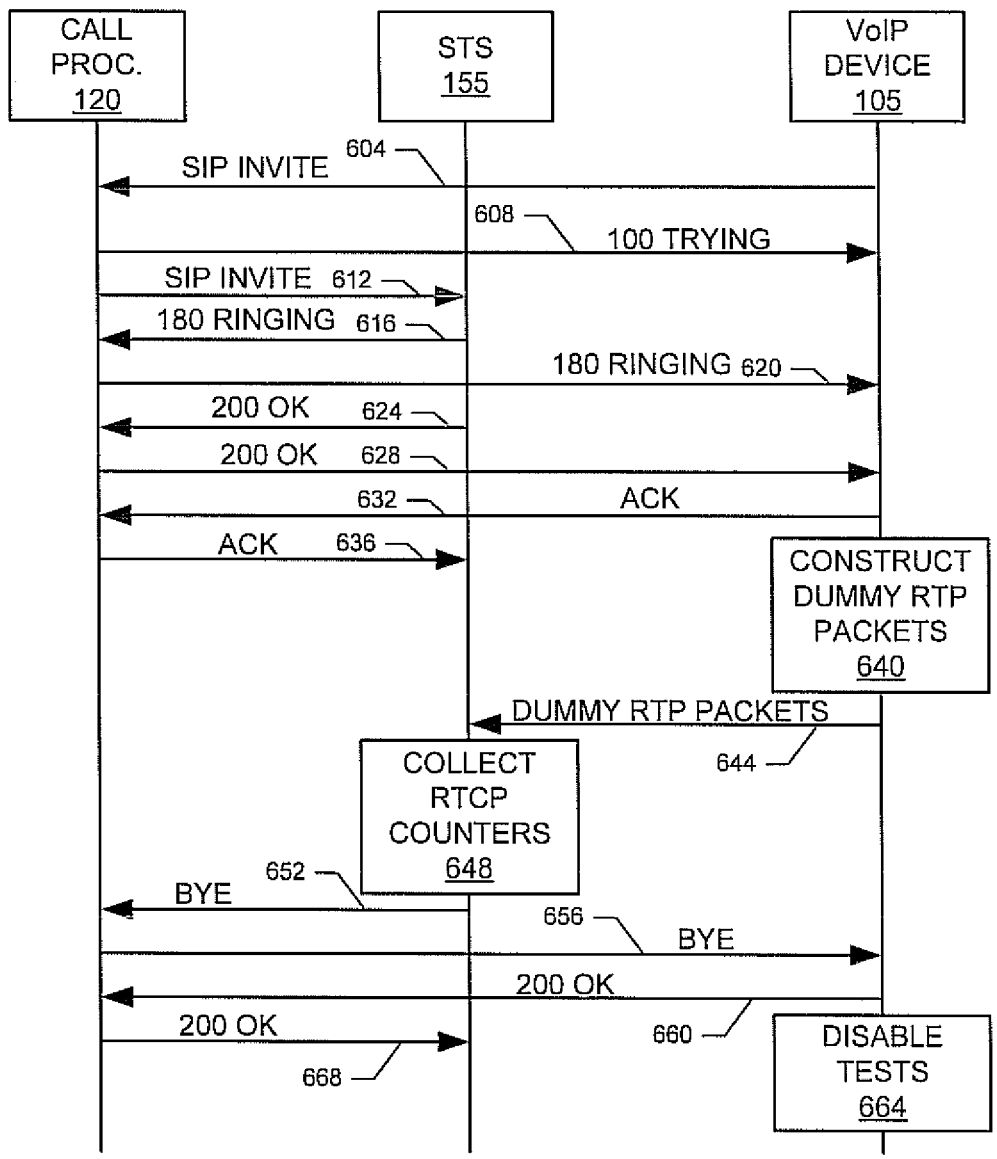

FIG. 6 diagrammatically illustrates another example behavior of the example VoIP communication system of FIG. 1. The example of FIG. 6 illustrates an example test call setup, bearer path testing and test call teardown. The example of FIG. 6 may be used to carryout the test call setups 540, 544, the bearer path testing 548 and/or the test call teardowns 552, 560 discussed above in connection with FIG. 5.

To initiate a test call and/or test communication session to a test call destination (e.g., the service testing server 155 of FIG. 1), a VoIP device (e.g., the example VoIP device 105) sends a SIP INVITE 604 to its serving call processor 120. The call processor 120 responds to the SIP INVITE 604 by sending a 100 TRYING 608 to the VoIP device 105 and sending a SIP INVITE 612 to the test call destination (i.e., the service testing server 155).

Upon receipt of the SIP INVITE 612, the service testing server 155 sends a 180 RINGING 616 to the call processor 120. Upon receipt of the 180 RINGING 616, the service testing server 155 sends 180 RINGING 620 to the VoIP device 105. Once the service testing server 155 accepts the test call, the service testing server 155 sends 200 OK 624 to the service testing server 155. The service testing server 155 then sends 200 OK 628 to the VoIP device 105. The VoIP device 105 acknowledges the 200 OK 628 by sending ACK 632. Upon receipt of the ACK 632, the service testing server 155 sends ACK 636 to the service testing server 155.

Once the 200 OK 628 is received and acknowledged by the VoIP device 105 and the ACK 636 is received by the service testing server 155, a VoIP bearer path (e.g. the bearer path 548 of FIG. 5) is established and available for sending, receiving and/or exchanging VoIP data.

Once the bearer path is established, the VoIP device constructs dummy and/or test RTP packets (block 640) and sends the RTP packets to the service testing server 155 via the bearer path as illustrated in FIG. 6 with reference numeral 644. The service testing server 155 receives the RTP packets to characterize the bearer path for the test call (bock 648).

Once the service testing server 155 has finished testing for the test call (e.g., a specified number of RTCP packets received), the service testing server 155 sends a BYE 652 to the call processor 120. Upon receipt of the BYE 652, the call processor 120 sends a corresponding BYE 656 to the VoIP device 105. The VoIP device 105 acknowledges receipt of the BYE 656 by sending a 200 OK 660 to the call processor 120. In the example of FIG. 6, after sending the 200 OK 660, the VoIP device 105 disables further test calls by, for example, clearing an internal variable do_test_call_internal (e.g., setting its value to FALSE) (block 664). The call processor 120 sends a corresponding 200 OK 668 to the service testing server 155 upon receipt of the 200 OK 660.

In the example of FIG. 6, the VoIP device 105 continues constructing and sending RTP packets until the BYE 656 is received. The receipt of the BYE 656 at the VoIP device 105 is an indication to the VoIP device 105 that the test call completed successfully. The service testing server 155 considers the test call completed once the BYE 652 is sent, regardless of whether the 200 OK 664 is received.

To accommodate a protocol error (e.g., the loss of the bearer path 548) between the VoIP device 105 and the service testing server 155 during testing (e.g., before the BYE 656 is received by the VoIP device 105), the VoIP device 105 implements a countdown timer having a duration of the maximum allowable length of a test call. If the countdown timer expires, the VoIP device 105 can perform any of a variety of error handling such as initiating a tear down of the test call or simply re-attempting the test call.

The example service testing server 155 is configured to accept a repeated test call when a VoIP device 105, 106, 107 and/or 108 did not receive the BYE 656 and, thus, did not know that the test call was successful. In this scenario, the example service testing server 155 recognizes the duplicate test call and does not send test results to the test management server 160.

While example behaviors of the example system of FIG. 1 are illustrated in FIGS. 5 and 6, persons of ordinary skill in the art will readily appreciate that the configuring and/or automated testing of VoIP services can be performed using any of a variety of other and/or additional method(s), process(es), action(s), protocol(s), exchange(s) and/or message(s). Further, the example exchanges illustrated in FIGS. 5 and/or 6 may include additional method(s), process(es), action(s), protocol(s), exchange(s) and/or message(s) and/or may include more than one of any or all of the illustrated method(s), process(es), action(s), protocol(s), exchange(s) and/or message(s).

Figure 7:
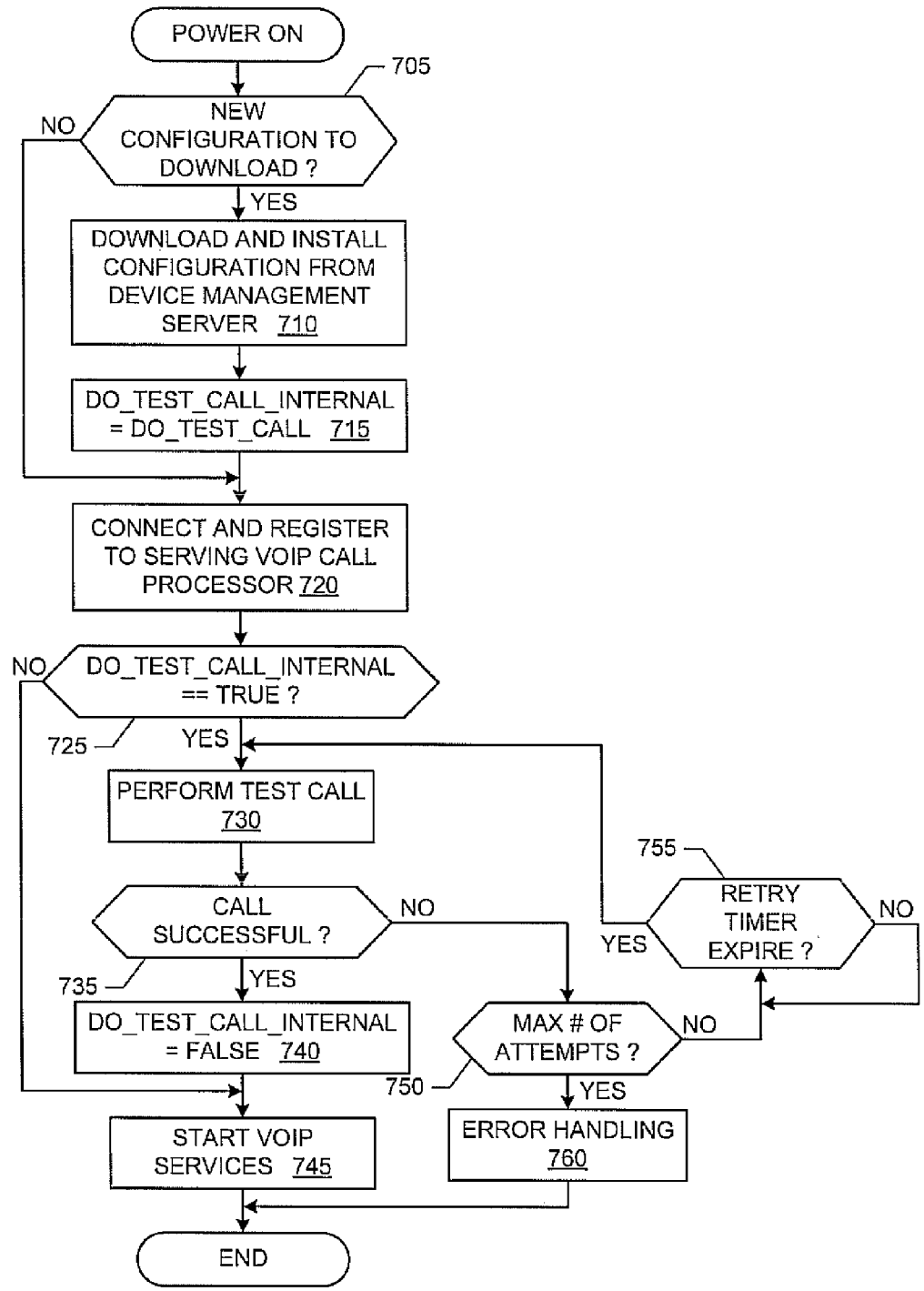
FIG. 7 is a flowchart representative of example machine readable instructions which may be executed to implement any of the example VoIP devices of FIGS. 1 and/or 2.
Figure 8:
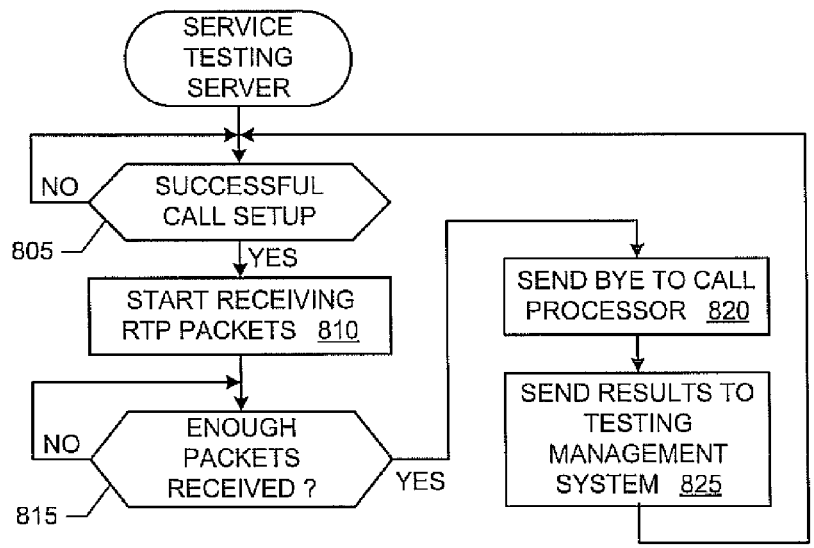
FIG. 8 is a flowchart representative of example machine readable instructions which may be executed to implement the example service testing server of FIGS. 1 and/or 3.
Figure 9:
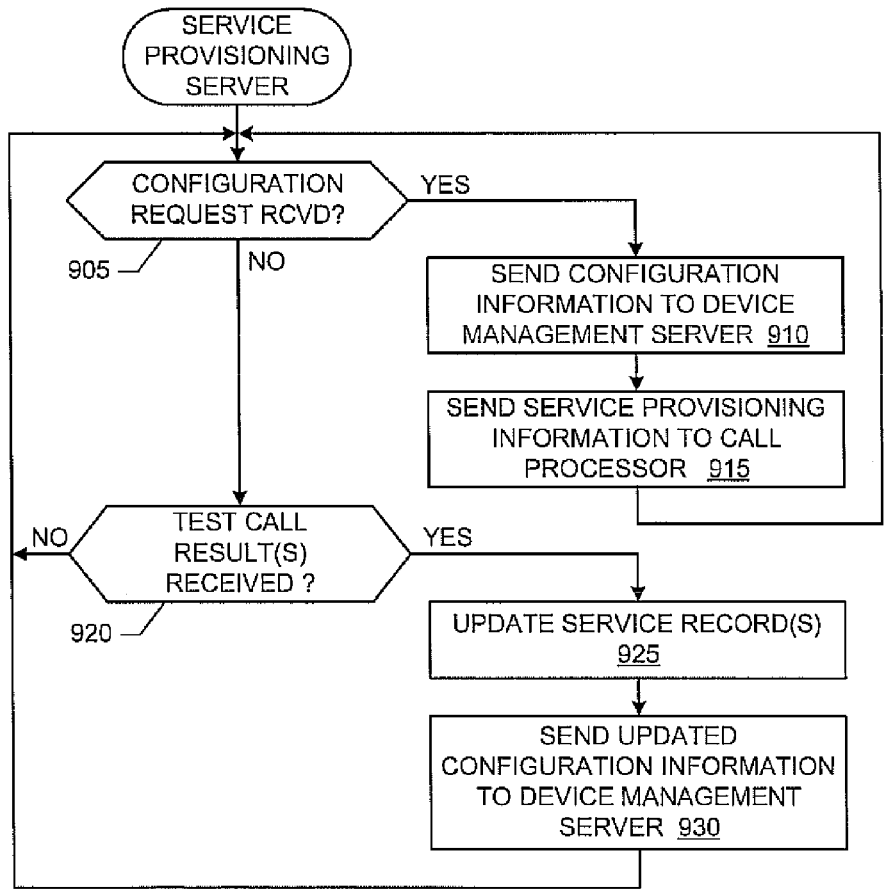
FIG. 9 is a flowchart representative of example machine readable instructions which may be executed to implement the example service provisioning server of FIG. 1.

FIGS. 7, 8 and 9 are flowcharts representative of example machine accessible instructions that may be executed to implement the example test module 110 of the VoIP devices 105, 106, 107 and 108 (and/or, more generally, the VoIP devices 105, 106, 107 and 108), the example service testing server 155, the example service provisioning server 150, respectfully, and/or, more generally, the example VoIP communication system of FIG. 1. The example machine accessible instructions of FIGS. 7, 8 and/or 9 may be executed by a processor, a controller and/or any other suitable processing device. For example, the example machine accessible instructions of FIGS. 7, 8 and/or 9 may be embodied in coded instructions stored on a tangible medium such as a flash memory, or RAM associated with a processor (e.g., the example processor 210 discussed above in connection with FIG. 2 and/or the example processor 1010 discussed below in connection with FIG. 10). Alternatively, some or all of the example flowcharts of FIGS. 7, 8 and/or 9 may be implemented using an application specific integrated circuit (ASIC), a programmable logic device (PLD), a field programmable logic device (FPLD), discrete logic, hardware, firmware, etc. Also, some or all of the example flowcharts of FIGS. 7, 8 and/or 9 may be implemented manually or as combination(s) of any of the foregoing techniques, for example, any combination of firmware, software, discrete logic and/or hardware. Further, although the example machine accessible instructions of FIGS. 7-9 are described with reference to the flowcharts of FIGS. 7-9 persons of ordinary skill in the art will readily appreciate that many other methods of implementing the example test module 110 of the example VoIP devices 105, 106, 107 and 108, (and/or, more generally, the VoIP devices 105, 106, 107 and 108), the example service testing server 155, the example service provisioning server 150 and/or, more generally, the VoIP communication system of FIGS. 1, 2 and/or 3 may be employed. For example, the order of execution of the blocks may be changed, and/or some of the blocks described may be changed, eliminated, sub-divided, or combined. Additionally, persons of ordinary skill in the art will appreciate that the example machine accessible instructions of FIGS. 7, 8 and/or 9 may be carried out sequentially and/or carried out in parallel by, for example, separate processing threads, processors, devices, discrete logic, circuits, etc.

The example machine readable instructions of FIG. 7 begin when a VoIP device (e.g., the example test call module 110 of the example VoIP device 105 of FIGS. 1 and/or 2) powers up and/or is initialized. The example machine readable instructions of FIG. 7 may also be used to re-configure and/or re-provision a VoIP device that is already providing VoIP services.

Upon power up and/or initialization, the VoIP device checks for a notification from a device management server (e.g., the example device management server 145 of FIG. 1) that new provisioning and/or configuration data is ready and/or available to be downloaded (block 705). If new provisioning and/or configuration data is to be downloaded (block 705), the VoIP device downloads and installs the provisioning and/or configuration data from the device management server (block 710). If new provisioning and/or configuration data is not be downloaded (block 705), control proceeds to block 720.

The test call module sets an internal do_test_call_internal flag based upon the do_test_call field of test call parameters received with and/or as a part of the download provisioning and/or configuration data (e.g., the example do_test_call field 415 of FIG. 4) (block 715). The VoIP device then connects and registers to its serving VoIP call processor (e.g., the example call processor 120 of FIG. 1) (block 720).

If the do_test_call_internal flag is TRUE (i.e., to perform a test call) (block 725), control proceeds to block 730 to initiate and/or perform the test call (block 730). If the do_test_call_internal flag is FALSE (block 725), control proceeds to block 745 to start VoIP services without initiating a test call.

At block 730, the test call module and/or, more generally, the VoIP device initiates and/or performs the test call by carrying out, for example, the example behavior illustrated in FIG. 6. If the test call is successful (e.g., the example BYE 656 of FIG. 6 is received) (block 735), the test call module sets the do_test_call_internal flag to FALSE (block 740), and starts and/or enables normal VoIP services (block 745). Control then exits from the example machine accessible instructions of FIG. 7.

Returning to block 735, if the test call did not complete successfully (block 735), the test call module determines if the maximum number of attempts to establish the test call and/or session have occurred (block 750). If the maximum number of attempts have not occurred (block 750), the test call module starts a countdown timer and waits for the timer to expire (block 755). When the countdown timer expires (block 755), control returns to block 730 to re-attempt the test call. If the test call did not complete successfully and the maximum number of attempts have occurred (block 750), the test call module and/or, more generally, the VoIP device performs any of a variety of error handling such as notifying the device management server 145, or displaying an error indication via a light emitting diode (LED) on a front of the VoIP device (block 760). Control then exits from the example machine accessible instructions of FIG. 7.

The example machine accessible instructions of FIG. 8 begin with an service testing server (e.g., the example service testing server 155 of FIGS. 1 and/or 3) waiting for a test call to be established by its SIP user agent (e.g., the example SIP user agent 315 of FIG. 3) via an intervening call processor (e.g., the example call processor 120 of FIG. 1) (block 805). When a test call is established (block 805), an analyzer (e.g., the example analyzer 320 of FIG. 3) starts receiving RTP packets and/or collecting RTCP counters (block 810).

The analyzer continues receiving RTP packets and collecting RTP packet count and/or the RTCP performance counter values until enough packets are received (e.g., a predetermined amount) (block 815). When enough packets are received (block 815), the SIP user agent sends a SIP BYE to the call processor (block 820). A management interface (e.g., the example management interface 325 of FIG. 3) sends and/or makes available the test result(s) from the test call to a test management server (e.g., the example test management server 160 of FIG. 1) (block 825). Control then returns to block 805 to wait for another test call to be established.

The example machine accessible instructions of FIG. 9 begin with a service provisioning server (e.g., the example service provisioning server 150 of FIG. 1) checking for a request to test, configure and/or provision a service (block 905). When a request to test, configure and/or provision a service is received at the service provisioning server (block 905), the service provisioning server sends corresponding test and/or service configuration and/or provisioning data to a device management server (e.g., the example device management server 145 of FIG. 1) (block 910). As necessary and appropriate, the service provisioning server sends corresponding service and/or provisioning information to a call processor (e.g., the example call processor 120 of FIG. 1) (block 915). Control then returns to block 905 to check for another configuration request.

At block 905, if a configuration request was not received (block 905), the service provisioning server checks if test call results were received (block 920). If test call results were not received (block 920), control returns to block 905 to check if a configuration request was received. If test call results were received (block 920), the service provisioning server updates service records for the corresponding VoIP service and/or device (block 925). If additional configuration and/or provisioning information need to be sent to the corresponding VoIP device, the service provisioning server sends the configuration and/or provisioning data to the VoIP device via the device management server (block 930). Control then returns to block 905 to check if a configuration request was received.

Depending upon the reason why a test call was configured (e.g., maintenance, new service, software update, service change or network change), the action taken by the service provisioning server when test call results are received may be accordingly different from that shown in FIG. 9 at blocks 925 and/or 930. For example, the service provisioning server may send and/or forward the test result(s) to a server that requested the provisioning, configuring and/or testing.

Figure 10:
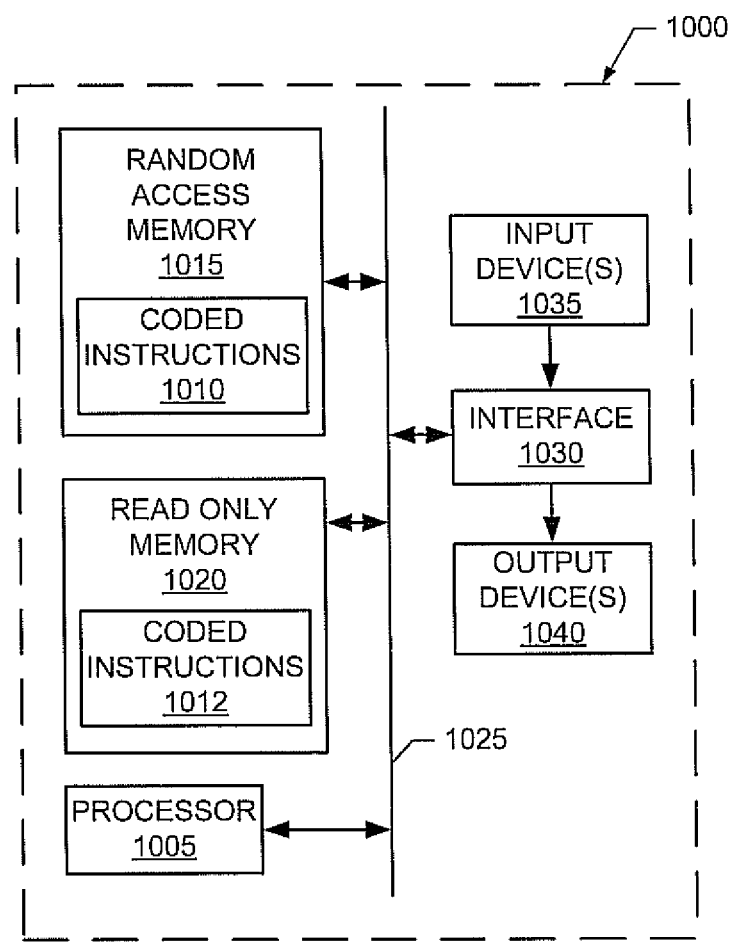
FIG. 10 is a schematic illustration of an example processor platform that may be used and/or programmed to execute the example machine readable instructions represented by FIGS. 7, 8 and/or 9 to implement the example VoIP devices, the example service testing server and/or the example service provisioning server of FIGS. 1, 2 and/or 3.

FIG. 10 is a schematic diagram of an example processor platform 1000 that may be used and/or programmed to implement the example test call modules 110, the example VoIP devices 105, the example service provisioning server 150 and/or the example service testing server 155 of FIGS. 1, 2 and/or 3. For example, the processor platform 1000 can be implemented by one or more general purpose processors, processor cores, microcontrollers, etc.

The processor platform 1000 of the example of FIG. 10 includes at least one general purpose programmable processor 1005. The processor 1005 executes coded instructions 1010 and/or 1012 present in main memory of the processor 1005 (e.g., within a RAM 1015 and/or a ROM 1020). The processor 1005 may be any type of processing unit, such as a processor core, a processor and/or a microcontroller. The processor 1005 may execute, among other things, the example machine accessible instructions of FIGS. 5 and/or 6 to perform network message processing. The processor 1005 is in communication with the main memory (including a ROM 1020 and the RAM 1015) via a bus 1025. The RAM 1015 may be implemented by DRAM, SDRAM, and/or any other type of RAM device, and ROM may be implemented by flash memory and/or any other desired type of memory device. Access to the memory 1015 and 1020 maybe controlled by a memory controller (not shown). The RAM 1015 may be used to store and/or implement, for example, the tests of test calls (e.g., the example results 556 of FIG. 5) and/or test, configuration and/or provisioning data and/or parameters.

The processor platform 1000 also includes an interface circuit 1030. The interface circuit 1030 may be implemented by any type of interface standard, such as an external memory interface, serial port, general purpose input/output, etc. One or more input devices 1035 and one or more output devices 1040 are connected to the interface circuit 1030. The input devices 1035 and/or output devices 1040 may be used to, for example, the keypad interface 255, the display interface 265, the network interface 270 of FIG. 2 and/or the network interface 305 of FIG. 3.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
a communication service server to provide a service to a user device;
a service provisioning server to initiate sending of provisioning data for the service to the user device, and to activate the service at the communication service server based on a service test result, the provisioning data comprising a service test parameter to instruct the user device to automatically initiate a test of the service to generate the service test result; and
a service testing server to:
establish a bearer path to perform the test of the service responsive to a request received from the user device to initiate the test of the service;
establish a companion real time control protocol channel to report the service test result to the service provisioning server, the companion real time control protocol channel to exchange real time packet stream performance information associated with the service test result;
send a BYE message in response to receiving a threshold number of packets, the BYE message to instruct the user device to stop sending packets; and
refrain from sending duplicate test results when repeated packets are received from the user device after the BYE message is sent.

2. An apparatus as defined in claim 1, wherein the service testing server is to receive test packets from the user device to perform the test of the service.

3. An apparatus as defined in claim 1, wherein the service provisioning server and the service testing server are separate servers.

4. An apparatus as defined in claim 1, further comprising a device management server to send the provisioning data to the user device.

5. An apparatus as defined in claim 1, further comprising a testing management server to receive the service test result from the service testing server and to provide the result to the service provisioning server.

6. An apparatus as defined in claim 1, wherein the service testing server comprises:
 a Session Initiation Protocol user agent to establish a communication session with the user device, the test of the service to be performed via the communication session; and
 an analyzer to receive a packet from the user device via the communication session to test the service.

7. An apparatus as defined in claim 1, wherein the user device comprises:
 a voice over Internet protocol processor; and
 a test call module to initiate the test of the service via the voice over Internet protocol processor based upon the service test parameter.

8. An apparatus as defined in claim 1, wherein the service is a voice over Internet protocol service, the test of the service is a voice over Internet protocol call, and the user device is at least one of a voice over Internet protocol phone, a voice over Internet protocol residential gateway, a personal computer, a voice over Internet protocol endpoint or a voice over Internet protocol adapter.

9. An apparatus as defined in claim 8, further comprising a call processor to receive a request to setup the voice over Internet protocol call from the user device and to establish the voice over Internet protocol call between the user device and the service testing server.

10. An apparatus as defined in claim 1, wherein the service provisioning data represents at least one of a new service, an update of the user device, a configuration parameter of the user device, a service parameter, a service test, a service maintenance event, a software update, or a configuration change to a communication network.

11. A method comprising:
 establishing a bearer path and a companion real time control protocol channel in response to receiving a configuration notification for a communication service provided to a user device, the companion real time control protocol channel to exchange real time packet stream performance information associated with a test of the communication service;
 sending service configuration data including a first test call parameter to the user device to provision the communication service and to enable the user device and a service testing server to test the communication service via the bearer path based on the first test call parameter;
 receiving a result of the test via the companion real time control protocol channel of the communication service;
 sending a BYE message in response to receiving a threshold number of packets, the BYE message to instruct the user device to stop sending packets;
 refraining from sending duplicate test results when repeated packets are received from the user device after the BYE message is sent; and
 in response to receiving the test result, activating the communication service to the user device.

12. A method as defined in claim 11, further comprising providing a service provisioning parameter to a voice over Internet Protocol call processor.

13. A method as defined in claim 11, further comprising providing a second test call parameter to the service testing server, wherein the service testing server is to perform the automatic test of the communication service based on the second test call parameter.

14. A method as defined in claim 13, further comprising receiving the test result from the service testing server.

15. A method as defined in claim 14, wherein the test result is received via a service testing management server.

16. A method as defined in claim 11, wherein the communication service is a voice over Internet protocol service, the test of the service is a voice over Internet protocol call and the user device is at least one of a voice over Internet protocol phone, a voice over Internet protocol residential gateway, a personal computer, a voice over Internet protocol endpoint or a voice over Internet protocol adapter.

17. A method as defined in claim 11, wherein the communication service is at least one of a new service to the user device, an update of the user device, a changed parameter for the user device, a changed service parameter, a service test, a service maintenance event, a software update, or a configuration change of a communication network.

18. A method as defined in claim 11, further comprising sending a second test call parameter to the user device after the automatic test of the service is completed, the second test call parameter to disable a test call initiation attempt at the user device.

19. A tangible machine readable storage medium, excluding propagating signals, comprising instructions which, when executed, cause a machine to perform operations comprising:
 establishing a bearer path and a companion real time control protocol channel in response to receiving a configuration notification for a communication service provided to a user device, the companion real time control protocol channel to exchange real time packet stream performance information associated with a test of the communication service;
 sending service configuration data including a first test call parameter to the user device to provision the communication service and to enable the user device and a service testing server to test the communication service via the bearer path based on the test call parameter;
 receiving a result of the test via the companion real time control protocol channel of the communication service;
 sending a BYE message in response to receiving a threshold number of packets, the BYE message to instruct the user device to stop sending packets;
 refraining from sending duplicate test results when repeated packets are received from the user device after the BYE message is sent; and
 in response to receiving the test result, activate the communication service to the user device with a quality of service parameter associated with the communication service based on the test result.

20. A tangible machine readable storage medium as defined in claim 19, wherein the operations further comprise providing a service provisioning parameter to a voice over Internet Protocol call processor.

21. A tangible machine readable storage medium as defined in claim 19, wherein the operations further comprise providing a second test call parameter to the service testing server.

22. A tangible machine readable storage medium as defined in claim 19, wherein the operations further comprise receiving the test result from the service testing server.

23. A tangible machine readable storage medium as defined in claim 22, wherein the test result is received via a service testing management server.

24. A tangible machine readable storage medium as defined in claim 19, wherein the communication service is a voice over Internet protocol service, the test of the service is a voice over Internet protocol call and the user device is at least one of a voice over Internet protocol phone, a voice over Internet protocol residential gateway, a personal computer, a voice over Internet protocol endpoint or a voice over Internet protocol adapter.

25. A tangible machine readable storage medium as defined in claim 19, wherein the communication service is at least one of a new service to the user device, an update of the user device, a changed parameter for the user device, a changed service parameter, a service test, a service maintenance event, a software update, or a configuration change of a communication network.

* * * * *